US012423404B2

(12) United States Patent
Kunimatsu

(10) Patent No.: US 12,423,404 B2
(45) Date of Patent: Sep. 23, 2025

(54) COMMUNICATION APPARATUS, CONTROL METHOD THEREFOR, AND NON-TRANSITORY COMPUTER-READABLE STORAGE MEDIUM STORING PROGRAM

(71) Applicant: CANON KABUSHIKI KAISHA, Tokyo (JP)

(72) Inventor: Aran Kunimatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 216 days.

(21) Appl. No.: 18/202,333

(22) Filed: May 26, 2023

(65) Prior Publication Data
US 2023/0385401 A1 Nov. 30, 2023

(30) Foreign Application Priority Data
May 31, 2022 (JP) .................................. 2022-088877

(51) Int. Cl.
  *H04L 29/06* (2006.01)
  *G06F 21/44* (2013.01)
  *G06F 21/60* (2013.01)
(52) U.S. Cl.
  CPC ............ *G06F 21/44* (2013.01); *G06F 21/602* (2013.01)
(58) Field of Classification Search
  CPC ............................... G06F 21/44; G06F 21/602
  See application file for complete search history.

(56) References Cited

U.S. PATENT DOCUMENTS

| 9,344,957 B2 | 5/2016 | Suga |
| 9,900,830 B2 | 2/2018 | Suga |
| 10,645,640 B2 | 5/2020 | Suga |

(Continued)

FOREIGN PATENT DOCUMENTS

| JP | 2015-023441 A | 2/2015 |
| JP | 2019-180036 A | 10/2019 |
| JP | 2019-193120 A | 10/2019 |

OTHER PUBLICATIONS

Wahei Sugawara, U.S. Appl. No. 18/202,329, filed May 26, 2023.

*Primary Examiner* — Evans Desrosiers
(74) *Attorney, Agent, or Firm* — VENABLE LLP

(57) ABSTRACT

A communication apparatus is able to receive, by a predetermined communication protocol, first information for connecting with a first external apparatus and able to output second information for performing authentication, by the predetermined communication protocol. The communication apparatus starts, based on a predetermined trigger, an operation in a waiting state to wait for a request of the authentication by the predetermined communication protocol, the request of the authentication being transmitted from a second external apparatus which have obtained the second information output from the communication apparatus, starts, based on the predetermined trigger, output of the second information, and in a case where the request of the authentication is received from the second external apparatus in a state that the communication apparatus operates in the waiting state, performs the authentication by the predetermined communication protocol based on a communication by the predetermined communication protocol between the communication apparatus and the second external apparatus.

17 Claims, 9 Drawing Sheets

(56) References Cited

U.S. PATENT DOCUMENTS

| | | |
|---|---|---|
| 10,719,280 B2 | 7/2020 | Shibata |
| 11,347,448 B2 | 5/2022 | Shibata |
| 11,635,925 B2 | 4/2023 | Shibata |
| 2007/0162748 A1* | 7/2007 | Okayama ............ H04L 63/0428 713/165 |
| 2013/0191670 A1* | 7/2013 | Haruki ................. G06F 1/3234 713/323 |
| 2019/0306165 A1* | 10/2019 | Kawamura ............... H04L 9/32 |
| 2019/0334892 A1 | 10/2019 | Goto |

* cited by examiner

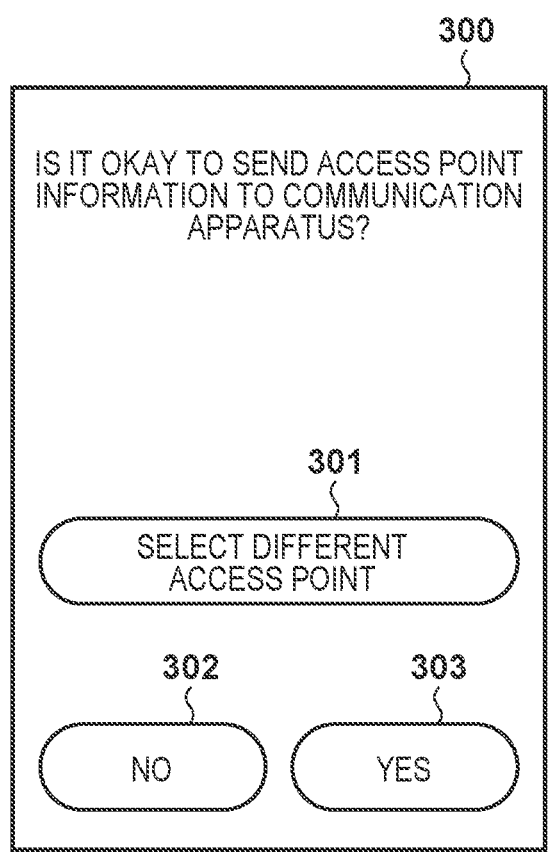

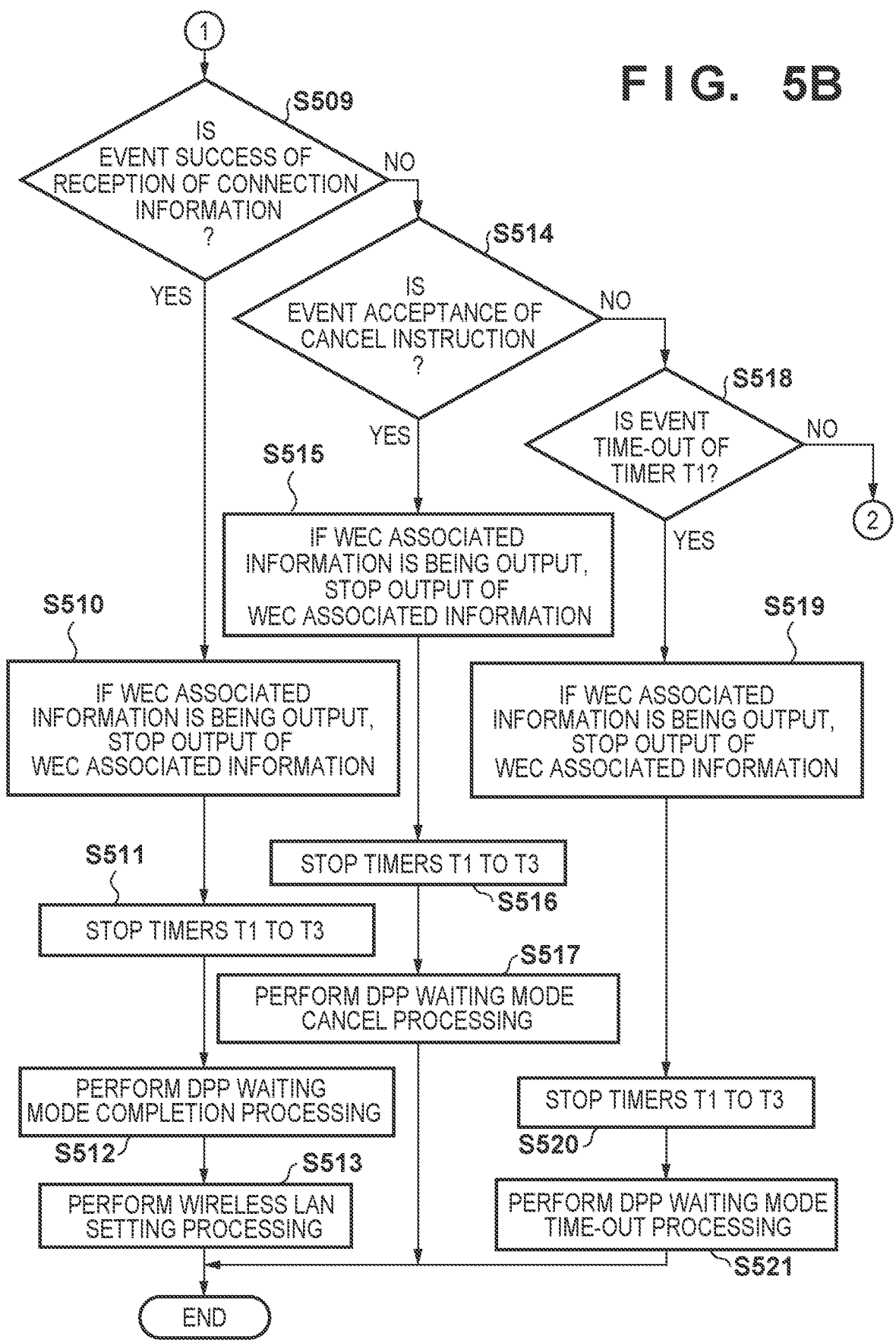

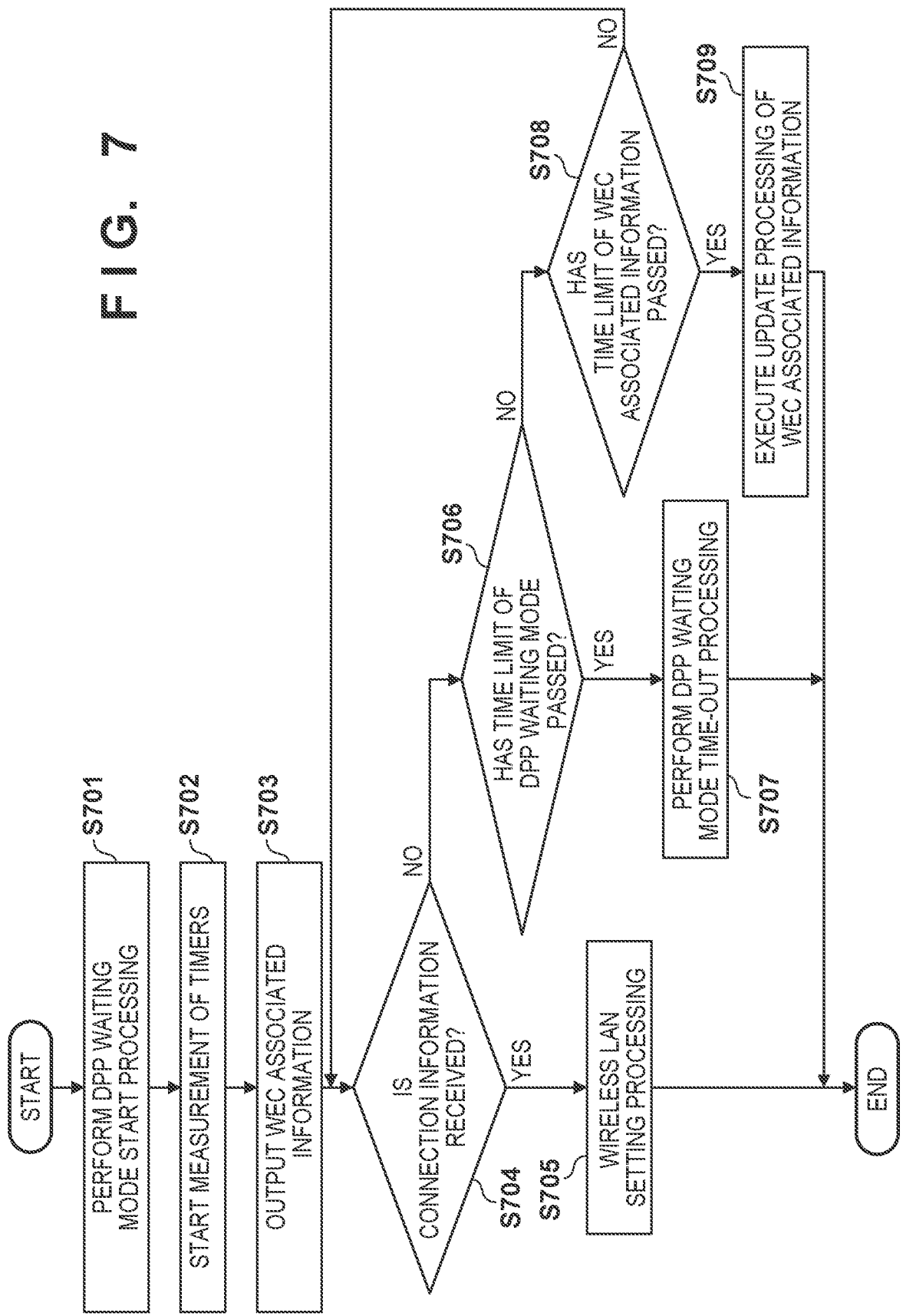

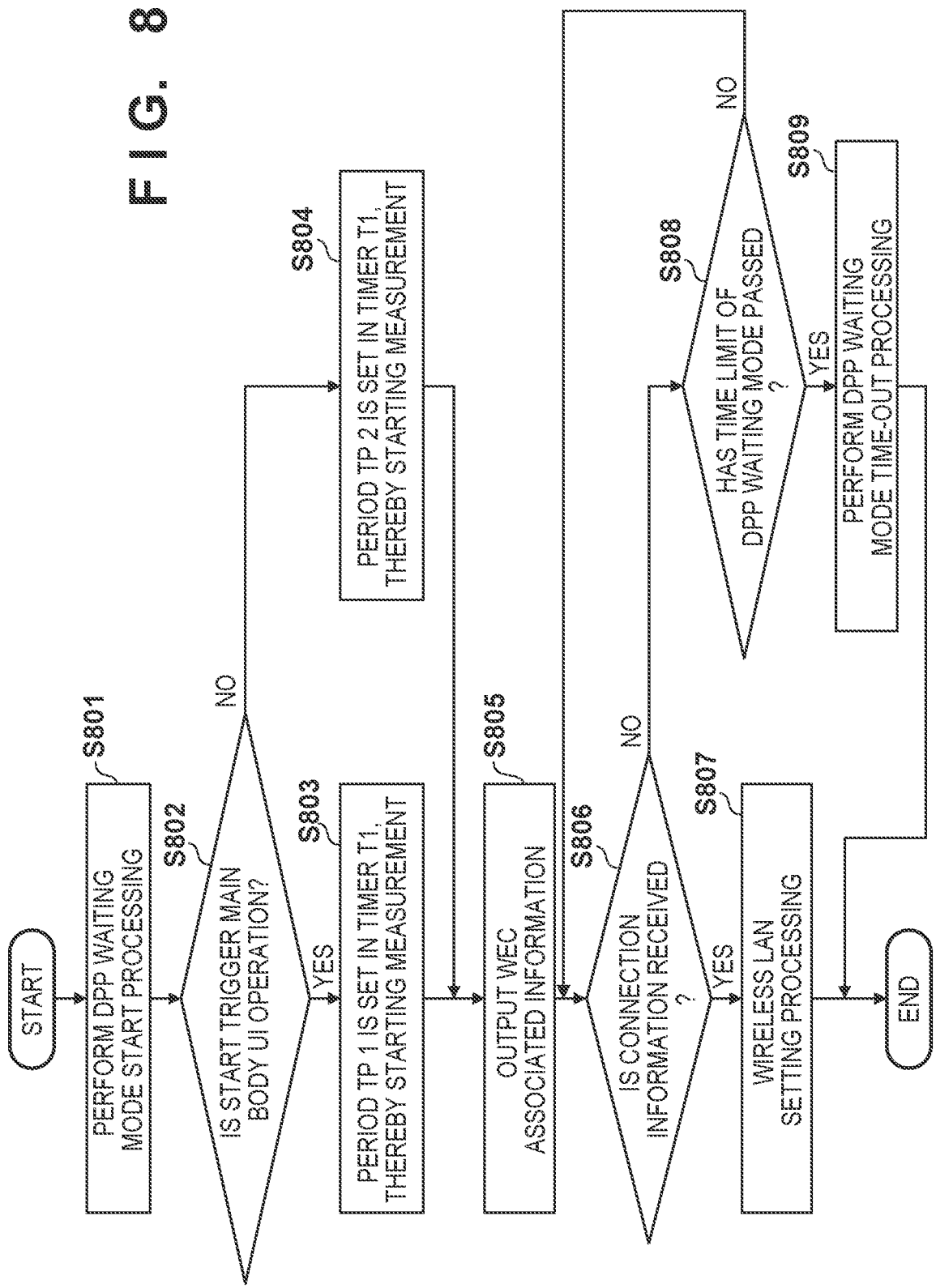

COMMUNICATION APPARATUS, CONTROL METHOD THEREFOR, AND NON-TRANSITORY COMPUTER-READABLE STORAGE MEDIUM STORING PROGRAM

BACKGROUND OF THE INVENTION

Field of the Invention

The present invention relates to a communication apparatus, a control method therefor, and a non-transitory computer-readable storage medium storing a program.

Description of the Related Art

There is known a technique of connecting a communication apparatus such as a printer and an external apparatus such as an access point using an information processing apparatus such as a Personal Computer (PC) or a smartphone. Japanese Patent Laid-Open No. 2019-180036 proposes a technique of transmitting/receiving, in connection between a communication apparatus and an external apparatus, network information between the apparatuses using Device Provisioning Protocol (to be referred to as DPP hereinafter) defined by the Wi-Fi Alliance.

SUMMARY OF THE INVENTION

The present invention provides a technique of improving both convenience and security in establishment of connection between a communication apparatus and an external apparatus.

The present invention in one aspect provides a communication apparatus comprising: a waiting unit configured to wait for transmission of first information for connection to a first external apparatus from a second external apparatus by a predetermined communication protocol; an output unit configured to output, in a waiting state of the waiting unit, second information to be used to authenticate communication with the second external apparatus by the predetermined communication protocol; and an update unit configured to update the second information output by the output unit in the waiting state.

According to the present invention, it is possible to improve both convenience and security in establishment of connection between a communication apparatus and an external apparatus.

Further features of the present invention will become apparent from the following description of exemplary embodiments with reference to the attached drawings.

BRIEF DESCRIPTION OF THE DRAWINGS

FIG. 3 is a view showing an example of a screen of the information processing apparatus;

FIGS. 5A and 5B are flowcharts illustrating an example of control of the communication apparatus;

FIG. 7 is a flowchart illustrating an example of control of the communication apparatus; and FIG. 8 is a flowchart illustrating an example of control of the communication apparatus.

DESCRIPTION OF THE EMBODIMENTS

Figure 1:
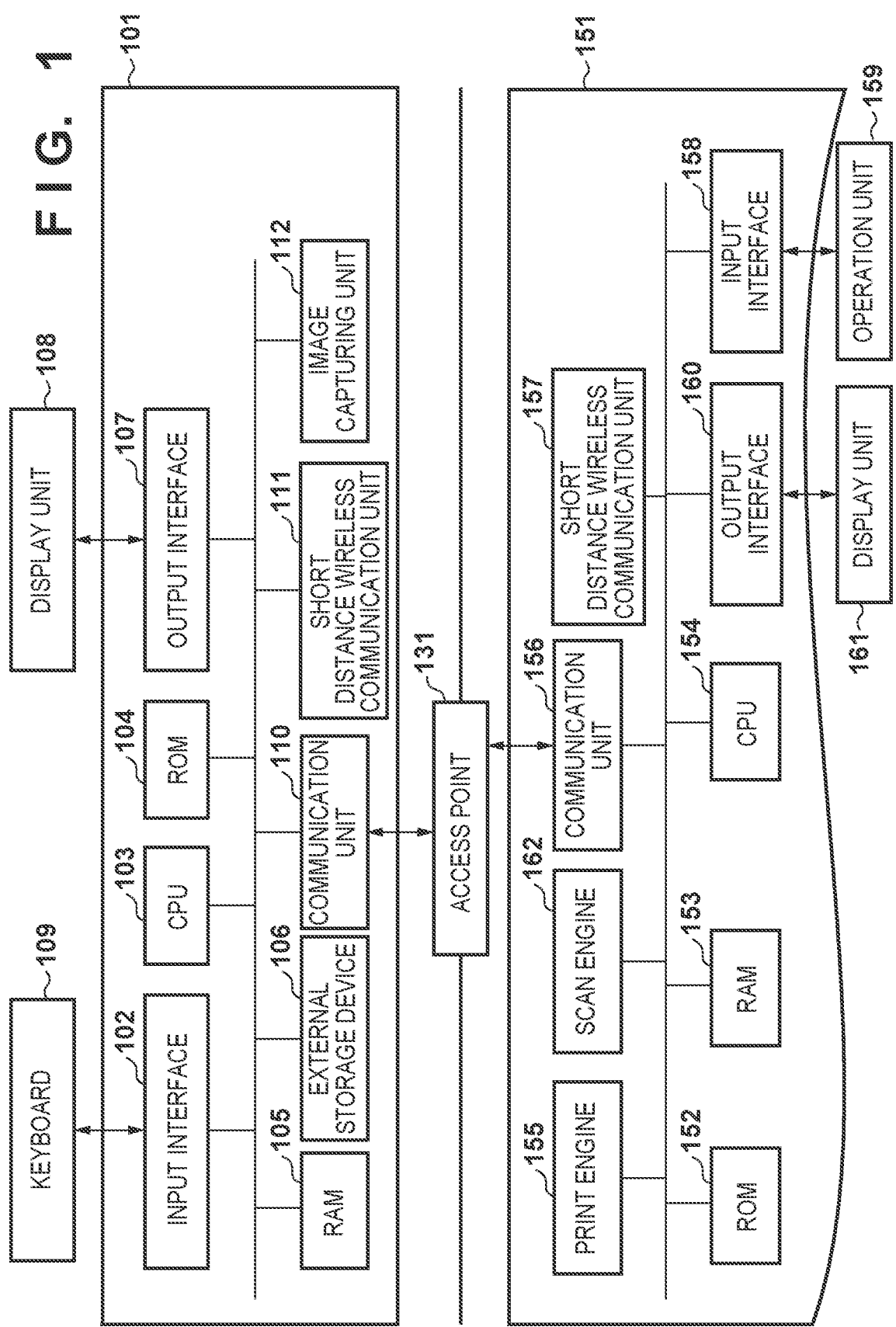
FIG. 1 is a block diagram showing the configuration of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the conventional technique, it is proposed to readily establish connection between a communication apparatus and an external apparatus by providing, to the communication apparatus, information of the external apparatus held by an information processing apparatus using DPP. In addition, the conventional technique gives an example in which an Enrollee provides Bootstrapping information including a public key to a Configurator using a QR Code® in DPP Bootstrapping. Then, secure authentication is implemented by trusting a key pair of the public key and a private key. More specifically, authentication based on the key pair is performed in DPP Authentication, and security is ensured by encryption by a common key. In establishment of connection between the communication apparatus and the external apparatus, it is desired to improve both convenience and security by readily establishing the connection.

According to the present disclosure, it is possible to improve both convenience and security in establishment of connection between the communication apparatus and the external apparatus.

First Embodiment

First, an information processing apparatus and a communication apparatus included in a communication system according to this embodiment will be described. In this embodiment, a smartphone is exemplified as the information processing apparatus but the present invention is not limited to this. For example, as the information processing apparatus, various kinds of apparatuses such as a portable terminal, a Personal Computer (PC), a tablet terminal, a Personal Digital Assistant (PDA), and a digital camera are applicable.

In this embodiment, a printer is exemplified as the communication apparatus but the present invention is not limited to this, and various kinds of apparatuses are applicable as long as they can perform wireless communication with the information processing apparatus. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

In this embodiment, the information processing apparatus and the communication apparatus can execute wireless communication based on a standard such as WiFi®. WiFi® is a communication standard based on the IEEE802.11 series.

This embodiment assumes that the information processing apparatus supports a function called Wi-Fi Easy Connect (to be referred to as WEC hereinafter). WEC is a function of executing a network setup of another apparatus using Device Provisioning Protocol (to be referred to as DPP hereinafter) defined by the Wi-Fi Alliance. Note that a network setup of another apparatus specifically indicates processing of connecting another apparatus to an access point forming a network.

In WEC, an apparatus (to be referred to as a Configurator apparatus hereinafter) operating in the role of "Configurator" and an apparatus (to be referred to as an Enrollee apparatus hereinafter) operating in the role of "Enrollee" communicate with each other. The Configurator apparatus acquires Bootstrapping information from the Enrollee apparatus. The Bootstrapping information includes, for example, identification information (MAC address or the like) of the Enrollee apparatus, and public key information to be used to execute secure communication with the Enrollee apparatus.

In this embodiment, the Bootstrapping information is described as "WEC associated information". Note that other information may be processed as WEC associated information. Then, the Configurator apparatus executes wireless communication with the Enrollee apparatus using the acquired Bootstrapping information. More specifically, for example, the Configurator apparatus encrypts a protocol key using the public key included in the Bootstrapping information, and transmits the encrypted protocol key to the Enrollee apparatus. Then, the Configurator apparatus encrypts a common key based on the encrypted protocol key, and transmits, to the Enrollee apparatus, information encrypted using the common key. Note that the transmitted information is specifically, for example, connection information for connection to the access point. Then, the Enrollee apparatus establishes wireless connection to the access point using the connection information received from the Configurator apparatus.

Note that in network setup processing by WEC according to this embodiment, the information processing apparatus supporting WEC operates as the Configurator apparatus, and the communication apparatus supporting WEC operates as the Enrollee apparatus.

<System Configuration>

First, the configuration of a system including an information processing apparatus 101 and a communication apparatus 151 that can communicate with the information processing apparatus 101 according to this embodiment will be described with reference to a block diagram shown in FIG. 1. The configuration shown in FIG. 1 will be exemplified below. However, the functions are not particularly limited to those shown in FIG. 1.

(Information Processing Apparatus)

The information processing apparatus 101 includes an input interface 102, a CPU 103, a ROM 104, a RAM 105, an external storage device 106, an output interface 107, a display unit 108, a communication unit 110, a short distance wireless communication unit 111, and an image capturing unit 112. The CPU 103, the ROM 104, the RAM 105, and the like form a computer of the information processing apparatus 101.

The input interface 102 is an interface configured to accept data input and operation instructions from the user when an operation unit such as a keyboard 109 is operated. Note that the operation unit may include a physical keyboard and physical buttons, or may include a software keyboard and software buttons displayed on the display unit 108. That is, the input interface 102 may accept an input operation from the user via the display unit 108.

The CPU 103 is a system control unit and controls the whole information processing apparatus 101.

The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (to be referred to as a setting application hereinafter) configured to perform a network setup of a communication apparatus 151, a print information generation program that generates print information interpretable by the communication apparatus 151, and the like. The setting application is, for example, an application program configured to set an access point as the connection destination of the communication apparatus 151 by WEC or the like. Note that the setting application may have functions other than the network setup function. For example, the setting application may have a function of causing the communication apparatus 151 to execute printing, a function of scanning a document set in the communication apparatus 151, a function of confirming the state of the communication apparatus 151, and the like. The setting application is stored in the external storage device 106 by being installed from an external server by, for example, Internet communication via the communication unit 110. Furthermore, the external storage device 106 stores various kinds of programs such as an information transmission/reception control program to be transmitted/received to/from the communication apparatus 151 connected via the communication unit 110, and various kinds of information to be used by the programs.

The output interface 107 is an interface configured to perform control for causing the display unit 108 to display data or make a notification concerning the state of the information processing apparatus 101.

The display unit 108 is formed by a Light-Emitting Diode (LED), a Liquid Crystal Display (LCD), or the like and displays data or makes a notification concerning the state of the information processing apparatus 101.

The communication unit 110 is a component connected to the apparatus such as the communication apparatus 151 or an access point 131 to execute data communication. For example, the communication unit 110 can be connected to an access point (not shown) in the communication apparatus 151. If the communication unit 110 and the access point in the communication apparatus 151 are connected, the information processing apparatus 101 and the communication apparatus 151 can communicate with each other. Note that the communication unit 110 may directly communicate with the communication apparatus 151 by wireless communication, or may perform communication via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. This embodiment assumes that a wireless communication method used by the communication unit 110 is based on the WiFi® standard. Assume also that WEC described above is executed by communication by the communication unit 110. In addition, for example, a device such as a wireless LAN router is used as the access point 131. Note that in this embodiment, the method of directly connecting the information processing apparatus 101 and the communication apparatus 151 without intervention of an external access point is called a direct connection method. In addition, the method of connecting the information processing apparatus 101 and the communication apparatus 151 via the external access point is called an infrastructure connection method.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), Wi-Fi Aware, or the like is used.

The image capturing unit 112 is, for example, a camera, and operates when an application operating on the information processing apparatus 101 executes an image capturing function. If the application executes the image capturing function, for example, information acquired from the image capturing unit 112 is processed by the CPU 103, and displayed as a live view on the display unit 108. At this time, if the application executes an image capturing operation, information acquired from the image capturing unit 112 is processed by the CPU 103, and stored as a captured image in the RAM 105. Furthermore, if the application executes a QR code acquisition function, information acquired from the image capturing unit 112 is processed by the CPU 103, and analyzed as a QR code thereby acquiring various kinds of information included in the QR Code®.

In this embodiment, the information processing apparatus 101 executes WEC by the OS of the information processing apparatus 101 based on a WEC execution instruction by the setting application.

(Communication Apparatus)

The communication apparatus 151 serves as the communication apparatus of this embodiment. The communication apparatus 151 includes a ROM 152, a RAM 153, a CPU 154, a print engine 155, a scan engine 162, an input interface 158, an output interface 160, an operation unit 159, a display unit 161, a communication unit 156, and the short distance wireless communication unit 157. The CPU 154, the ROM 152, the RAM 153, and the like form a computer of the communication apparatus 151.

The CPU 154 is a system control unit and controls the whole communication apparatus 151.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information.

Note that a memory such as an external HDD or an SD card may be attached as an optional device to the communication apparatus 151, and information stored in the communication apparatus 151 may be stored in the memory.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is required to use, for communication of the print job, a communication method that allows high-speed communication. Therefore, the communication apparatus 151 receives the print job via the communication unit 156 that can perform communication at a speed higher than that of the short distance wireless communication unit 157.

Based on an input from an operation unit 159 or a scan job received from the information processing apparatus 101 or the like, the scan engine 162 reads image data or document data from a set document or the like. The read data is stored as a scan result in the RAM 153 or transmitted to the information processing apparatus 101 or the like. Note that in general, the data amount of the scan result transmitted from the communication apparatus 151 to the information processing apparatus 101 or the like is large, and thus it is required to use, for communication of the scan result, a communication method that allows high-speed communication. Therefore, the communication apparatus 151 transmits the scan result via the communication unit 156 that can perform communication at a speed higher than that of the short distance wireless communication unit 157. The input interface 158 is an interface configured to accept data input and operation instructions from the user when the operation unit 159 such as a physical button is operated. Note that the operation unit 159 may include a software keyboard and software buttons displayed on the display unit 161. That is, the input interface 158 may accept input from the user via the display unit 161.

The output interface 160 is an interface configured to perform control for causing the display unit 161 to display various data or make a notification concerning the state of the communication apparatus 151.

The display unit 161 is formed by a Light-Emitting Diode (LED), a Liquid Crystal Display (LCD), or the like and displays data or makes a notification concerning the state of the communication apparatus 151. Note that this embodiment will describe a case where the operation unit 159 and the display unit 161 are configured as an operation display unit formed from a touch panel display.

The communication unit 156 includes, as the access point in the communication apparatus 151, an access point for connection to the apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. This embodiment assumes that the wireless communication method used by the communication unit 156 is a communication standard based on the IEEE802.11 series. In the following description, Wireless Fidelity (Wi-Fi)® indicates a communication standard based on the IEEE802.11 series. If the communication apparatus 151 supports WEC, WEC described above is executed by communication by the communication unit 156. The communication unit 156 may include a hardware component functioning as an access point or may operate as an access point by software for functioning as an access point.

The communication apparatus 151 of this embodiment can operate in an infrastructure mode or a Peer-To-Peer (P2P) mode as a mode for performing communication using the communication unit 156.

The infrastructure mode is a mode in which the communication apparatus 151 communicates with another apparatus such as the information processing apparatus 101 via an external apparatus (for example, the access point 131) forming a network. That is, the infrastructure mode is a mode in which the communication apparatus 151 establishes infrastructure connection to the information processing apparatus 101 via the external access point (the access point 131). In this embodiment, in the infrastructure connection, the communication apparatus 151 operates as a station and the external access point operates as a master. Note that in this embodiment, the master is an apparatus that decides a communication channel used in a network to which the master belongs, and the station is an apparatus that does not decide a communication channel used in a network to which the station belongs, and uses the communication channel decided by the master.

The P2P mode is a mode in which the communication apparatus 151 directly communicates with another apparatus such as the information processing apparatus 101 without intervention of an external apparatus forming a network. That is, the P2P mode is a mode in which the communication apparatus 151 establishes direct connection to the information processing apparatus 101 without intervention of the external access point (the access point 131). In this embodiment, in the P2P mode, for example, the communication apparatus 151 may communicate with another apparatus by Wi-Fi Direct® (to be referred to as WFD hereinafter). Note that which of a plurality of WFD-capable apparatuses operates as a master is decided in accordance with, for example, the Group Owner Negotiation procedure. Note that the master may be decided without executing the Group Owner Negotiation procedure. An apparatus that is a WFD-capable apparatus and serves as a master is called a Group Owner. Other examples of the P2P mode are an AP mode and an ad hoc mode in which the communication apparatus 151 operates as the access point to perform communication based on the normal Wi-Fi standard. In the AP mode, connection information (SSID and password) of the access point enabled in the communication apparatus 151 can arbitrarily be set by the user. In this embodiment, in the direct connection, the communication apparatus 151 operates as a master and the other apparatus operates as a station.

Furthermore, in this embodiment, the communication apparatus 151 can operate in a network setup mode as a mode of executing a network setup of the communication apparatus 151 by accepting a predetermined operation from the user. If the communication apparatus 151 operates in the network setup mode, it uses the communication unit 156 to operate as a setup access point which is enabled during the operation in the network setup mode. The setup access point is an access point different from an access point enabled in the above-described AP mode. Furthermore, the SSID of the setup access point includes a predetermined character string that can be recognized by the setting application of the information processing apparatus 101. The setup access point is an access point that does not require a password for connection. The communication apparatus 151 operating in the network setup mode uses a predetermined communication protocol (setup communication protocol) in communication with the information processing apparatus 101 connected to the setup access point. More specifically, the setup communication protocol is, for example, Simple Network Management Protocol (SNMP). Another practical example of the setup communication protocol is Hypertext Transfer Protocol (HTTP). If a predetermined time elapses after the start of the operation in the network setup mode, the communication apparatus 151 stops the operation in the network setup mode, and disables the setup access point. This is because the setup access point is an access point that does not require a password, as described above, and thus if the access point is enabled for a long time, an inappropriate apparatus highly probably requests connection. Note that the setup access point may be an access point that requires a password. In this case, a password used for connection to the setup access point is a fixed password (unchangeable by the user) that is grasped in advance by the setting application.

Furthermore, in this embodiment, the communication apparatus 151 can operate in a mode for executing a network setup of the communication apparatus 151 by a communication protocol different from the setup communication protocol. This embodiment assumes that the communication protocol different from the setup communication protocol is DPP described above, and this mode is called a DPP waiting mode. Upon receiving a network setup request by DPP from the information processing apparatus 101 in a state in which the communication apparatus 151 operates in the DPP waiting mode, the communication apparatus 151 executes a network setup by DPP. Therefore, in other words, the DPP waiting mode is a mode for waiting for a network setup request by DPP.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

<Example of Sequence by Information Processing Apparatus and Communication Apparatus>

Figure 2:
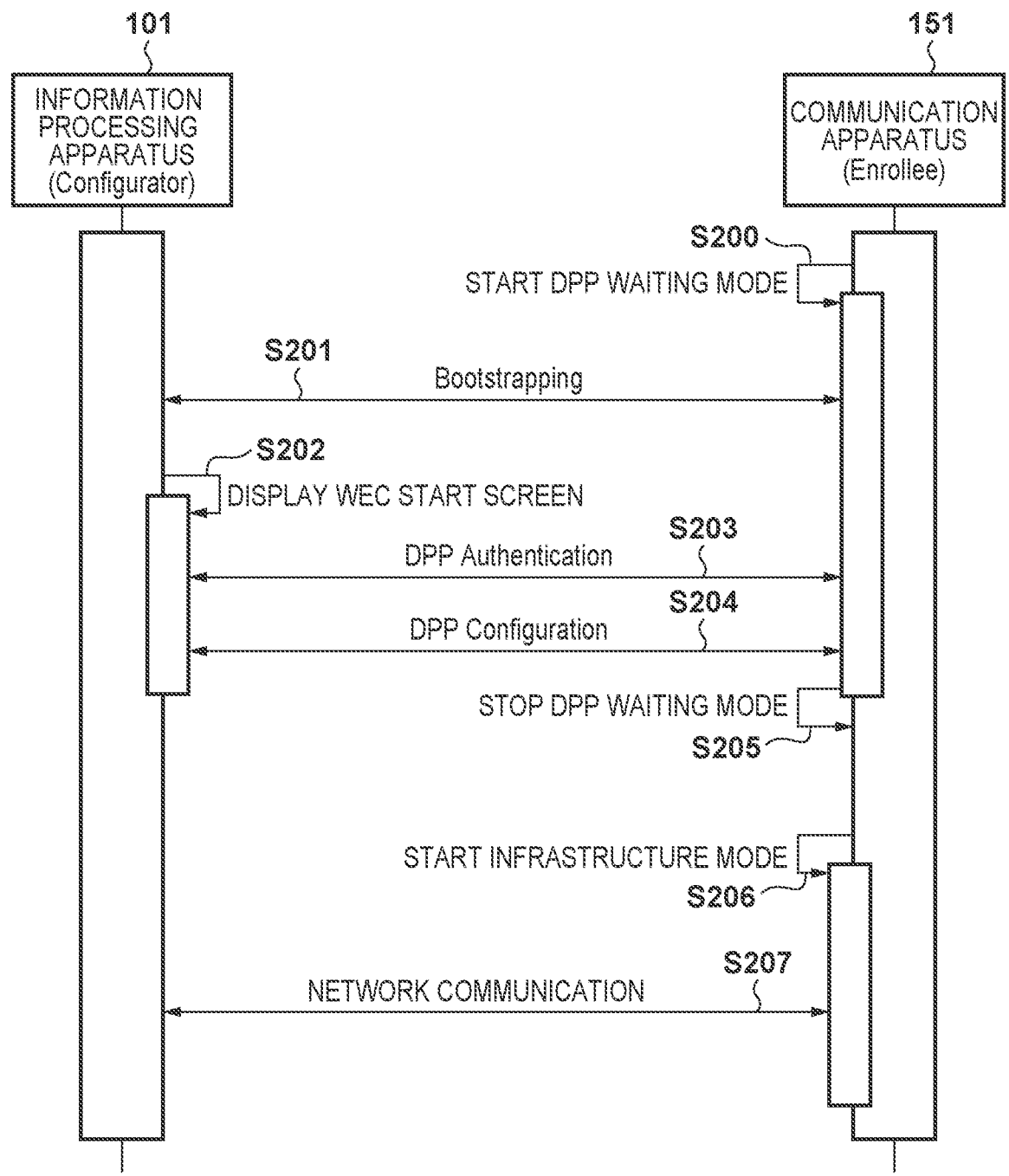
FIG. 2 is a sequence chart showing processing of an information processing apparatus and a communication apparatus 151.

Processing executed by the information processing apparatus 101 and the communication apparatus 151 in WEC using DPP will be described with reference to FIGS. 2 and 3. A sequence shown in FIG. 2 is implemented when, for example, the CPU of each apparatus reads out a program stored in the ROM of each apparatus, the external storage device, or the like to the RAM of each apparatus and executes the program.

In S200, the communication apparatus 151 starts the DPP waiting mode. A trigger (to be sometimes referred to as a start trigger hereinafter) for starting the DPP waiting mode may be, for example, a user operation via the operation unit 159 or reception of a specific signal from an external apparatus such as the information processing apparatus 101. Details will be described later. After the start of the DPP waiting mode, the communication apparatus 151 outputs WEC associated information. As an example of the output of the WEC associated information, the communication apparatus 151 generates a QR Code® based on the WEC associated information, and displays the generated QR Code® on the display unit 161. Note that instead of the QR code °, another code such as a barcode may be generated and displayed on the display unit 161. The communication apparatus 151 is in a waiting mode for waiting for reception of connection information (SSID, password, and the like) necessary for connection to the access point from the information processing apparatus 101 from when the DPP waiting mode is started until the DPP waiting mode is ended by processing to be described later.

In S201, Bootstrapping is executed between the information processing apparatus 101 and the communication apparatus 151. More specifically, the information processing apparatus 101 acquires WEC associated information by Bootstrapping. For example, if a QR Code® is used for Bootstrapping, the information processing apparatus 101 executes a QR code capturing function in the setting application. The QR code capturing function captures the QR Code® using the image capturing unit 112, and analyzes the QR Code® from the captured image. This allows the setting application to acquire the WEC associated information included in the QR Code®.

In S202, the information processing apparatus 101 starts WEC using DPP by the function of the OS. More specifically, first, the information processing apparatus 101 instructs, from the setting application, the OS to activate a WEC application, thereby activating the WEC application. Thus, the WEC application operates in the foreground and the setting application operates in the background. Note that, for example, execution of the activation instruction corresponds to an instruction to execute WEC. Thus, the information processing apparatus 101 displays a WEC start screen by the WEC application. Note that the WEC application is a program installed in advance in the information processing apparatus 101, and is a program provided by the OS vendor of the information processing apparatus 101. If the WEC application is activated, the WEC associated information acquired by the setting application is provided to the WEC application.

FIG. 3 shows an example of the WEC start screen displayed by the WEC application. Regions 301, 302, and 303 are displayed on a WEC start screen 300. The region 301 is a region for changing an access point set as a setting target of WEC. Note that before the region 301 is operated, the access point set as the setting target of WEC is the access point currently connected to the information processing apparatus 101. If the region 301 is selected, the information processing apparatus 101 displays a list of access points, and newly sets an access point selected from the list by the user as the setting target of WEC. Note that the list of access points includes access points to which the information processing apparatus 101 has been connected once. The region 302 is a region for canceling execution of WEC, and the region 303 is a region for instructing execution of WEC. If the region 302 is operated, the information processing apparatus 101 ends the processing shown in the sequence chart. If the region 303 is pressed, the information processing apparatus 101 advances to S203.

In S203, processing called DPP Authentication is executed between the information processing apparatus 101 and the communication apparatus 151 by the function of the OS of the information processing apparatus 101. More specifically, the WEC application of the information processing apparatus 101 executes API of WEC using the WEC associated information and information concerning the access point set as the setting target of WEC, thereby instructing the OS to execute WEC. Then, the DPP Authentication is executed between the information processing apparatus 101 and the communication apparatus 151 by the function of the OS. In the DPP Authentication, authentication information, information used to encrypt information, and the like are communicated between the information processing apparatus 101 and the communication apparatus 151, thereby authenticating communication between the apparatuses. Note that various kinds of information transmitted from the information processing apparatus 101 in the communication of the DPP Authentication are encrypted based on the WEC associated information acquired from the communication apparatus 151 by the information processing apparatus 101. More specifically, in the DPP Authentication, first, the information processing apparatus 101 transmits an Authentication Request as a network setup request by DPP. Next, the communication apparatus 151 operating in the DPP waiting mode is operating in the DPP waiting mode that is a mode for waiting for the Authentication Request. Therefore, the communication apparatus 151 receives the Authentication Request transmitted from the information processing apparatus 101. Upon receiving the Authentication Request, the communication apparatus 151 attempts to decrypt the received Authentication Request using a decryption key currently held by the communication apparatus. If the decryption succeeds, the communication apparatus 151 transmits an Authentication response to the information processing apparatus 101, thereby authenticating communication with the information processing apparatus 101. Note that if the information processing apparatus 101 cannot acquire correct WEC associated information, and cannot encrypt the information correctly, decryption by the communication apparatus 151 fails. Therefore, authentication fails, and no Authentication response is transmitted. When the information processing apparatus 101 receives the Authentication response, the DPP Authentication is completed. Furthermore, in the DPP Authentication, communication is executed using DPP.

In S204, processing called DPP Configuration is executed between the information processing apparatus 101 and the communication apparatus 151 by the function of the OS of the information processing apparatus 101. In the DPP Configuration, the information processing apparatus 101 transmits connection information for connection to the access point set as the setting target of WEC to the communication apparatus 151 by WEC. Note that the connection information can include at least one or more of pieces of information representing the SSID, password, and encryption method of the access point set as the setting target of WEC. The password transmitted at this time is information input by the user on a screen displayed by an application supported by the OS when the connection between the information processing apparatus 101 and the access point is established. This is information held by the OS when the connection between the information processing apparatus 101 and the access point is established. Furthermore, the password is information that is not held by the setting application. Since the password transmitted at this time is information already held by the OS, and the DPP Configuration is processing executed by the OS, the password need not newly be input by the user on the screen displayed by the setting application. That is, the password as the connection information can be transmitted from the information processing apparatus 101 to the communication apparatus 151 by secure communication by WEC without newly accepting the input of the password on the screen displayed by the setting application. Note that even in the DPP Configuration, communication is executed using DPP.

In S205, upon completion of the DPP Configuration, the communication apparatus 151 ends the DPP waiting mode.

In S206, upon acquiring the connection information in the DPP Configuration, the communication apparatus 151 transitions to the infrastructure mode. Then, the communication apparatus 151 attempts to perform connection to the access point corresponding to the connection information using the connection information acquired in S204. If the connection succeeds, the communication apparatus 151 can execute communication via the network formed by the connected access point from then on. Note that the communication via the network formed by the connected access point is executed by a protocol (more specifically, for example, Port 9100, SNMP, HTTP, or a protocol unique to the vendor of the communication apparatus 151) different from DPP.

Note that the communication apparatus 151 may transmit, to the information processing apparatus 101, information representing whether connection to the access point corresponding to the connection information acquired by WEC succeeds or not. Furthermore, if connection to the access point corresponding to the connection information acquired by WEC fails, information representing the cause of the failure may be transmitted to the information processing apparatus 101. The information transmission may be executed using DPP. Note that the connection to the access point corresponding to the connection information acquired by WEC fails because a communication error occurs in WEC, the access point cannot be found, or the WEC associated information acquired from the communication apparatus 151 is not appropriate information. The connection fails also because, for example, the encryption method used for connection to the access point set as the setting target of WEC is an encryption method that is not supported by the communication apparatus 151. The connection fails also because, for example, the encryption method used for connection to the access point set as the setting target of WEC is an encryption method that is not supported by WEC. Note that the information processing apparatus 101 may display, on the display unit 108, information representing whether connection between the communication apparatus 151 and the access point corresponding to the connection information acquired by WEC succeeds or not. If the connection between the communication apparatus 151 and the access point corresponding to the connection information acquired by WEC fails, information representing the cause of the failure may be displayed on the display unit 108.

In S207, infrastructure connection is established between the information processing apparatus 101 and the communication apparatus 151. More specifically, the information processing apparatus 101 switches, based on the end of the execution of WEC, the application operating in the foreground from the WEC application to the setting application. Then, the information processing apparatus 101 searches for the communication apparatus 151 on the network to which the information processing apparatus 101 itself belongs. This processing is implemented by the setting application that has received, from the OS, a notification representing that execution of WEC is ended. If the communication apparatus 151 is found, the information processing apparatus 101 requests capability information from the communication apparatus 151, and the communication apparatus 151 transmits the capability information to the information processing apparatus 101. Thus, the information of the communication apparatus 151 is registered on the setting application, and communication with the communication apparatus 151 can be executed by the setting application from then on. More specifically, for example, a print job can be transmitted to the communication apparatus 151 by the setting application. Note that at this time, if the information processing apparatus 101 belongs to the network formed by the access point to which the communication apparatus 151 is connected by WEC, communication with the communication apparatus 151 can be executed via the access point. Furthermore, if communication between the information processing apparatus 101 and the communication apparatus 151 cannot be executed because, for example, the access point to which the communication apparatus 151 is connected is not the access point to which the information processing apparatus 101 is connected, the request or acquisition of capability information is omitted. Note that the communication in S207 is executed using, for example, a communication protocol different from DPP and the setup communication protocol. After that, the information processing apparatus 101 ends the processing shown in the sequence chart.

Note that a form in which the WEC start screen is displayed by the WEC application, and the WEC application executes API of WEC to instruct the OS to execute WEC has been described above. However, the present invention is not limited to this form. For example, the WEC start screen may be displayed by the setting application. In addition, the setting application may execute API of WEC to instruct the OS to execute WEC.

The method using the QR Code® has been exemplified as the Bootstrapping method. However, the present invention is not limited to this form. For example, short distance wireless communication such as NFC or BLE may be used as the Bootstrapping method. As another method, communication by a communication protocol such as SNMP or HTTP via the setup access point activated in the DPP waiting mode may be used.

As described above, when attempting to perform connection to the external access point, the communication apparatus 151 is set in the DPP waiting mode to output the WEC associated information, and then waits for information of the access point as the connection destination from the information processing apparatus 101. From the viewpoint of ensuring security, the DPP waiting mode can be set so that a time-out occurs in a predetermined time, but a waiting period is desirably long in consideration of user convenience. If the waiting period is short, an unintended time-out occurs, and it may be necessary to prompt the user to perform an operation of entering the DPP waiting mode again. Therefore, to ensure both user convenience and security, the communication apparatus 151 according to this embodiment performs processing shown in FIGS. 5A and 5B and provides a UI shown in each of FIGS. 4A to 4F.

<Examples of UI of Communication Apparatus>

FIGS. 4A to 4F are views each showing an example of the User Interface (UI) of the communication apparatus 151.

More specifically, FIGS. 4A to 4F each show an example of the UI displayed on the communication apparatus 151 at the time of execution of WEC using DPP or the like. Note that in this example, a case where the operation unit 159 and the display unit 161 are configured as an operation display unit formed from a touch panel display will be exemplified but the arrangement of the communication apparatus 151 is not limited to this. Since these are examples of the UI, designs, messages, details of the UI arrangement, and the like can appropriately be changed.

Figure 4A:
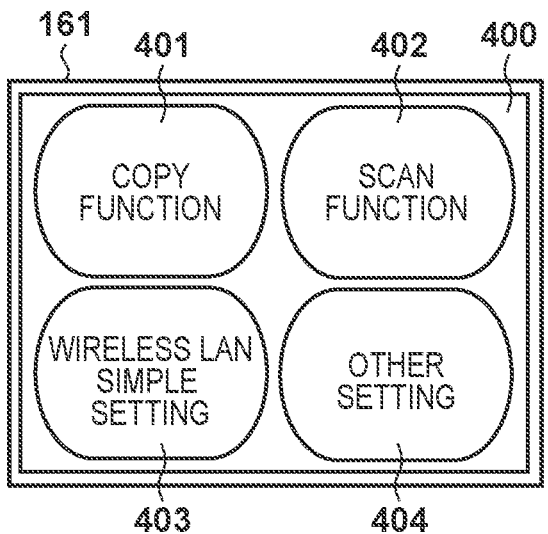
FIGS. 4A to 4F are views each showing an example of a User Interface (UI) of the communication apparatus.

FIG. 4A shows an example of an idle screen 400. A copy function button 401, a scan function button 402, a wireless LAN simple setting button 403, and another setting button 404 are displayed on the idle screen 400. The copy function button 401 is a button for displaying the menu of the copy function of the communication apparatus 151. The scan function button 402 is a button for displaying the menu of the scan function of the communication apparatus 151. The wireless LAN simple setting button 403 is a button for starting the wireless LAN simple setting function of the communication apparatus 151, and a network setup of the communication apparatus 151 is executed by the wireless LAN simple setting function. That is, in this embodiment, the pressing of the wireless LAN simple setting button 403 can be one of the start triggers of the DPP waiting mode.

Note that the start trigger is not limited to the pressing of the wireless LAN simple setting button 403. For example, a user operation different from the operation via the operation unit 159 or reception of a specific signal from an external apparatus such as the information processing apparatus 101 may be used as a start trigger. A practical example of the user operation different from the operation via the operation unit 159 is a power-on operation by pressing the power button of the communication apparatus 151. Practical examples of the reception of the specific signal from the external apparatus such as the information processing apparatus 101 are reception of a specific BLE beacon and reception of specific wireless LAN communication. The other setting button 404 is a button for displaying the menu of the other setting function of the communication apparatus 151. Processing executed when each of the copy function button 401, the scan function button 402, and the other setting button 404 is pressed is not included in the contents of the processing of the DPP waiting mode to be described here, and a description thereof will be omitted.

Figure 4B:
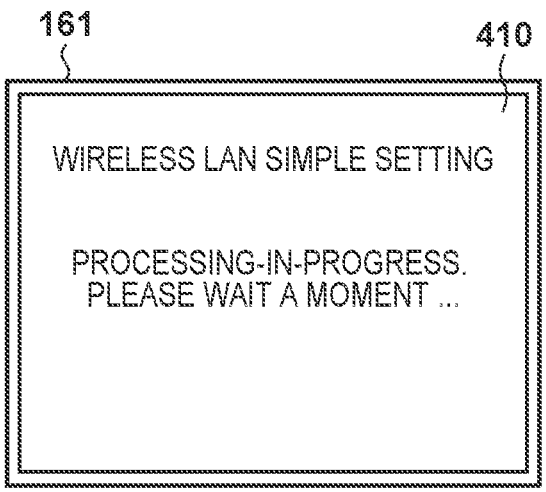

FIG. 4B shows a wireless LAN simple setting processing-in-progress screen 410. The wireless LAN simple setting processing-in-progress screen 410 is a screen temporarily displayed when performing start processing or stop processing of the wireless LAN simple setting, cancel processing, processing to update the WEC associated information, or the like.

Figure 4C:
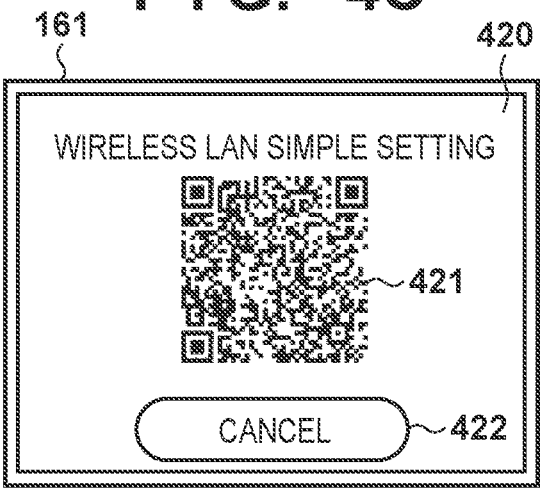

FIG. 4C shows a wireless LAN simple setting main screen 420. The wireless LAN simple setting main screen 420 is a screen mainly displayed while the communication apparatus 151 operates in the DPP waiting mode, and a WEC associated information region 421 and a cancel button 422 are displayed on the screen. The WEC associated information region 421 is a region for performing display concerning the WEC associated information. In this embodiment, the WEC associated information is encoded into a QR Code® and displayed. In this embodiment, this is because the WEC associated information is output by displaying the QR Code® on the display unit 161.

Note that if another form is executed to output the WEC associated information, different contents may be displayed in the WEC associated information region 421. If, for example, short distance wireless communication using NFC is used to output the WEC associated information, a message of "please do NFC touch" or the like may be displayed in the WEC associated information region 421. If communication by a communication protocol such as SNMP or HTTP via the setup access point is used to output the WEC associated information, a message of "please operate setting application" or the like may be displayed in the WEC associated information region 421. The cancel button 422 is a button for canceling the operation of the communication apparatus 151 in the DPP waiting mode. Upon the pressing of this button, the communication apparatus 151 accepts a cancel instruction. That is, in this embodiment, the pressing of this button can be one of triggers (to be sometimes referred to as stop triggers hereinafter) for stopping the DPP waiting mode. Note that the stop trigger is not limited to the pressing of the button. For example, a user operation different from the operation via the operation unit 159 or reception of a specific signal from an external apparatus such as the information processing apparatus 101 may be used as a stop trigger. A practical example of the user operation different from the operation via the operation unit 159 is a power-off operation by pressing the power button of the communication apparatus 151. Practical examples of the reception of the specific signal from the external apparatus such as the information processing apparatus 101 are reception of a specific BLE beacon and reception of specific wireless LAN communication. Furthermore, if reception of the connection information to the access point, which is necessary for wireless LAN setting, succeeds by executing the processing of the wireless LAN simple setting function, the DPP waiting mode can be stopped. If a time-out of a timer indicating the time limit of the DPP waiting mode occurs, the DPP waiting mode can be stopped.

Figure 4D:
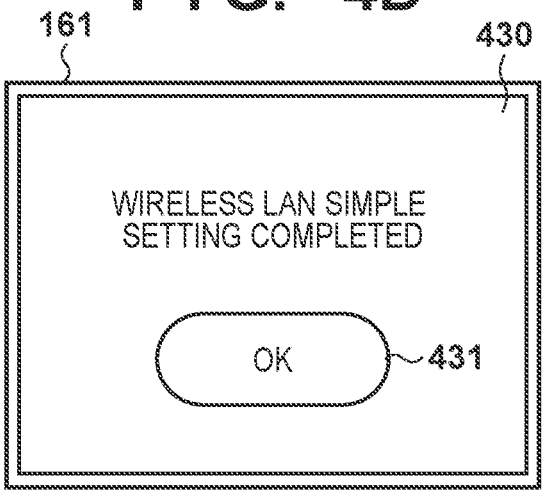

FIG. 4D shows a wireless LAN simple setting completion screen 430. The wireless LAN simple setting completion screen 430 is a screen indicating the completion of the wireless LAN simple setting function, and an OK button 431 is displayed on the screen. Upon the pressing of the OK button 431, the display of the display unit 161 returns to the idle screen 400.

Figure 4E:
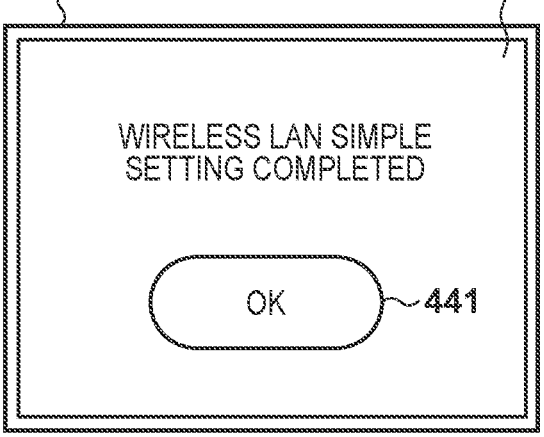
Figure 4F:
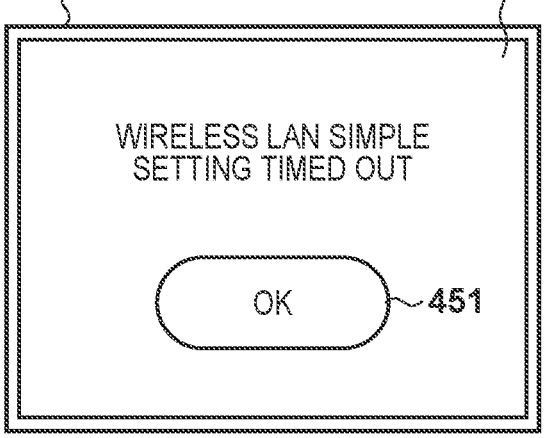

FIG. 4E shows a wireless LAN simple setting cancel screen 440. The wireless LAN simple setting cancel screen 440 is a screen indicating the stop of the wireless LAN simple setting function by a cancel instruction, and an OK button 441 is displayed on the screen. Upon the pressing of the OK button 441, the display of the display unit 161 returns to the idle screen 400. FIG. 4F shows a wireless LAN simple setting time-out screen 450. The wireless LAN simple setting time-out screen 450 is a screen indicating the completion of the wireless LAN simple setting, and an OK button 451 is displayed on the screen. Upon the pressing of the OK button 451, the display of the display unit 161 returns to the idle screen 400.

<Example of Control of Communication Apparatus>

Figure 5A:
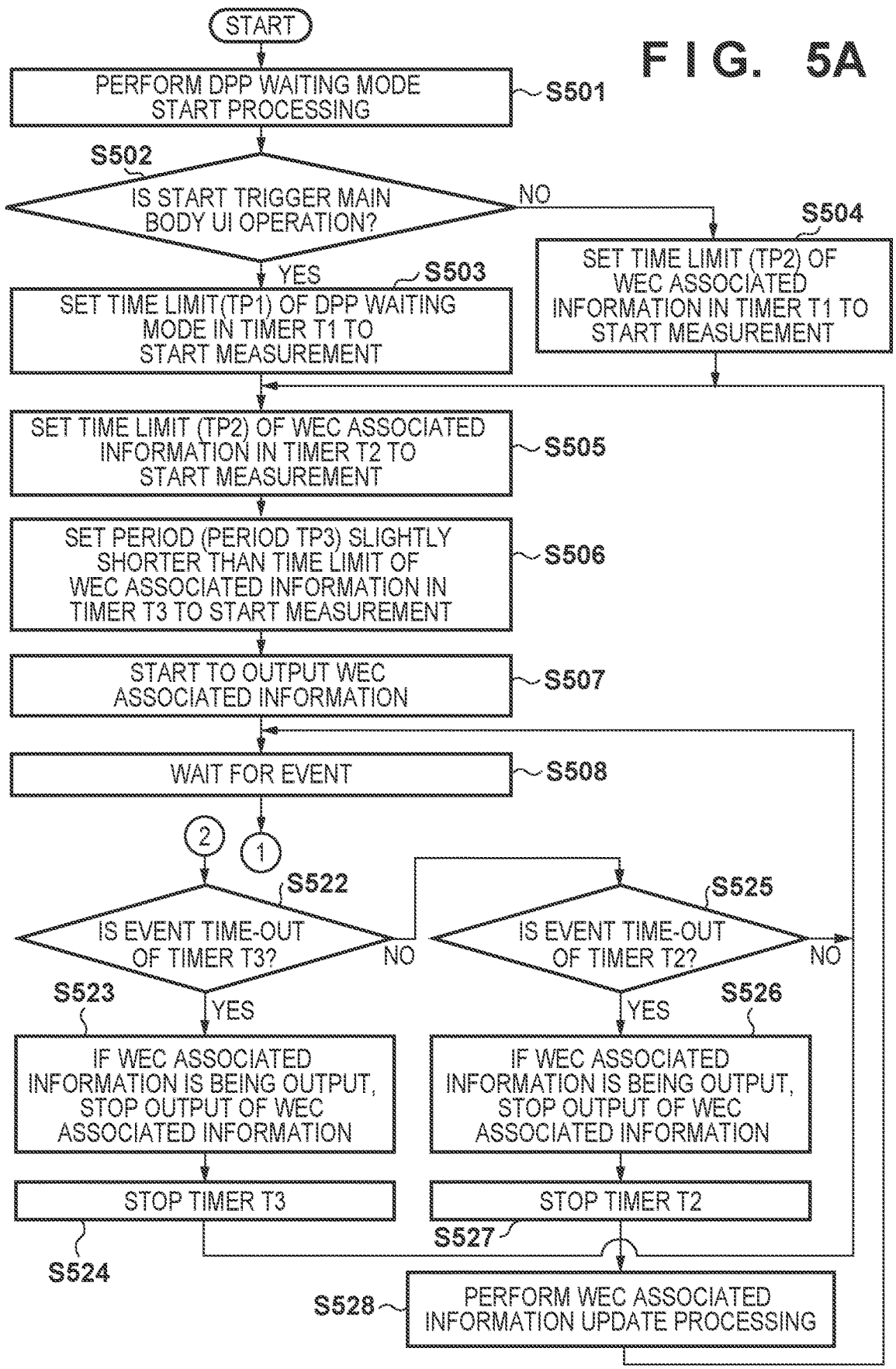

FIGS. 5A and 5B are flowcharts illustrating an example of control of the communication apparatus 151. This flowchart is implemented when, for example, the CPU 154 of the communication apparatus 151 reads out a program stored in the ROM 152 or the like to the RAM 153 and executes the program.

This flowchart is started upon accepting the start trigger of the DPP waiting mode. The start trigger is, for example, the pressing of the wireless LAN simple setting button 403 by the user. Upon the pressing of the wireless LAN simple setting button 403, the display unit 161 transitions from the idle screen 400 to the wireless LAN simple setting processing-in-progress screen 410.

In step S501, the communication apparatus 151 performs DPP waiting mode start processing. More specifically, the communication apparatus 151 activates the setup access point (not shown) using the communication unit 156, and prepares for connection to the information processing apparatus 101 and communication with the information processing apparatus 101 for a setup. Furthermore, the communication apparatus 151 generates WEC associated information to be output by Bootstrapping. In this example, there exists a public key as an element forming the WEC associated information but this is based on a key pair of the public key and a private key to be used in the subsequent DPP Authentication. This key pair may be generated in the DPP waiting mode start processing or may be generated in advance. As a practical example, the key pair may be generated along with power-on processing of the communication apparatus 151 or may be generated in the background of the display of the idle screen 400 on the display unit 161. The key pair generated in advance is held in the RAM 153, and read out at the start of the processing in step S501. By starting the DPP waiting mode, the communication apparatus 151 waits for transmission of the connection information for connection to an access point (for example, the access point 131) as an external apparatus from the information processing apparatus 101 by DPP as a predetermined protocol.

In step S502, the communication apparatus 151 determines whether the start trigger is the operation (main body UI operation) of the operation unit 159 of the communication apparatus 151. If it is determined that the start trigger is the operation of the operation unit 159, the communication apparatus 151 executes step S503; otherwise, the communication apparatus 151 executes step S504. An example of the case where the start trigger is not the operation of the operation unit 159 is reception of a specific signal from an external apparatus such as the information processing apparatus 101.

In step S503, a predetermined period (a period TP1) designated as the time limit of the DPP waiting mode is set in a timer T1 held by the communication apparatus 151, thereby starting measurement. Note that measurement by the timer T1 may be based on a hardware timer or a software timer.

In step S504, a predetermined period (a period TP2) designated as the time limit for outputting the WEC associated information is set in the timer T1 held by the communication apparatus 151, thereby starting measurement. If the time limit (period TP1) of the DPP waiting mode is compared with the time limit (period TP2) of the WEC associated information, the time limit (period TP2) of the WEC associated information is shorter.

The timer T1 is a timer used to stop the DPP waiting mode by occurrence of a time-out. That is, the procedure described in steps S502 to S504 can shorten the duration of the DPP waiting mode started by an operation other than the operation of the operation unit 159, as compared with the duration of the DPP waiting mode started by the operation of the operation unit 159. This considers, for example, the possibility that an attacker in a remote place attempts to remotely activate the DPP waiting mode of the communication apparatus 151 and illegally perform wireless LAN setting. In this embodiment, in a case of an instruction from a remote place, the duration of the DPP waiting mode is short, thereby making it possible to improve security against an attack from a remote place. On the other hand, if the operation of the operation unit 159 with which the possibility of an attack from a remote place is relatively low is used as the start trigger, the duration of the DPP waiting mode is relatively prolonged, thereby making it possible to improve user convenience.

In step S505, the period TP2 designated as the time limit of the WEC associated information is set in the timer T2 held by the communication apparatus 151, thereby starting measurement. Note that the timer T2 may be based on a hardware timer or a software timer.

The timer T2 is a timer for updating the WEC associated information by occurrence of a time-out. The update target is, particularly, the key pair of the public key and the private key to be used in the DPP Authentication. By periodically updating the key pair in the DPP waiting mode, it is possible to improve security of communication by DPP.

In step S506, the communication apparatus 151 sets, in a timer T3 held by the communication apparatus 151, a period (a period TP3) slightly shorter than the period TP2 designated as the time limit of the WEC associated information, thereby starting measurement. Note that the timer T3 may be based on a hardware timer or a software timer.

The timer T3 is a timer for stopping the output of the WEC associated information before the update of the WEC associated information by occurrence of a time-out. In DPP, a small time lag may occur after the information processing apparatus 101 acquires the WEC associated information output from the communication apparatus 151 until the DPP Authentication is performed. If the communication apparatus 151 updates the WEC associated information during this time lag, an authentication failure in the DPP Authentication is assumed. Therefore, by stopping the output of the WEC associated information before the update of the WEC associated information, it is possible to suppress an authentication failure in the DPP Authentication during the time lag. That is, the communication apparatus 151 can switch, based on the timers T2 and T3, in the DPP waiting mode, between the output state of outputting the WEC associated information and the output stop state of stopping the output of the WEC associated information.

In step S507, the communication apparatus 151 starts to output the generated WEC associated information. In other words, the communication apparatus 151 outputs information including public key information to be used for authentication of communication with the information processing apparatus 101 by DPP. The display unit 161 transitions from the wireless LAN simple setting processing-in-progress screen 410 to the wireless LAN simple setting main screen 420. The start of the output of the WEC associated information is, for example, to encode the WEC associated information into a QR Code® and display the QR Code® in the WEC associated information region 421. Note that the WEC associated information may be output by another method. For example, the WEC associated information may be set in a readable state by being stored in the memory area on the RAM 153 that can be read out by an external apparatus such as the information processing apparatus 101 by short distance wireless communication such as NFC. Alternatively, for example, the WEC associated information may be set in a readable state by being stored in the memory area on the RAM 153 that can be read out by an external apparatus such as the information processing apparatus 101 by protocol communication using SNMP or the like.

In step S508, the communication apparatus 151 is set in an event waiting state. Examples of an event are exchange of Bootstrapping, DPP Authentication, DPP Configuration, and the like with an external apparatus, operation input by the user, and a time-out of each of the timers T1 to T3. In addition, an example of an event is the success of reception of the connection information. If an event occurs, the communication apparatus 151 determines an event type by determination processes in subsequent steps S509, S514, S518, S522, and S525.

In step S509, the communication apparatus 151 determines whether the occurred event is the success of reception of the connection information. The connection information is information such as the SSID and password of the access point 131 acquired from an external apparatus such as the information processing apparatus 101. If the occurred event is the success of reception of the connection information, the communication apparatus 151 advances to step S510; otherwise, the communication apparatus 151 advances to step S514. Note that a practical example of determination of whether the event is the success of reception of the connection information will be described later (see FIG. 6).

In step S510, if the WEC associated information is being output, the communication apparatus 151 stops the output. For example, if the QR Code® is being displayed as the WEC associated information in the WEC associated information region 421 of the wireless LAN simple setting main screen 420 on the display unit 161, the communication apparatus 151 stops the display. For example, if the external apparatus can read out the WEC associated information by short distance wireless communication such as NFC, the communication apparatus 151 clears the WEC associated information stored in the predetermined memory area on the RAM 153, thereby disabling reading of the WEC associated information. Furthermore, for example, if the external apparatus can read out the WEC associated information by protocol communication using SNMP or the like, the communication apparatus 151 clears the WEC associated information stored in the predetermined memory area on the RAM 153, thereby disabling reading of the WEC associated information. At this time, the display unit 161 transitions from the wireless LAN simple setting main screen 420 to the wireless LAN simple setting processing-in-progress screen 410.

In step S511, the communication apparatus 151 stops each of the timers T1 to T3, and clears it.

In step S512, the communication apparatus 151 performs DPP waiting mode completion processing. More specifically, the communication apparatus 151 stops the setup access point (not shown) using the communication unit 156. The communication apparatus 151 deletes information such as the WEC associated information and the key pair. Then, the display unit 161 transitions from the wireless LAN simple setting processing-in-progress screen 410 to the wireless LAN simple setting completion screen 430.

In step S513, the communication apparatus 151 performs wireless LAN setting processing. This corresponds to the processes in S206 and S207 of FIG. 2, and a detailed description thereof will be omitted. Generally, the communication apparatus 151 transitions to the infrastructure mode, and is connected to the access point 131 based on the received connection information using the communication unit 156.

On the other hand, if the process advances from step S509 to S514, the communication apparatus 151 determines whether the occurred event is acceptance of a cancel instruction. If the occurred event is acceptance of a cancel instruction, the communication apparatus 151 advances to step S515; otherwise, the communication apparatus 151 advances to step S518.

In step S515, if the WEC associated information is being output, the communication apparatus 151 stops the output. Processing contents are the same as in step S510.

In step S516, the communication apparatus 151 stops each of the timers T1 to T3, and clears it.

In step S517, the communication apparatus 151 performs DPP waiting mode cancel processing. More specifically, the communication apparatus 151 stops the setup access point (not shown) using the communication unit 156. The communication apparatus 151 deletes information such as the WEC associated information and the key pair. Then, the display unit 161 transitions from the wireless LAN simple setting processing-in-progress screen 410 to the wireless LAN simple setting cancel screen 440.

On the other hand, if the process advances from step S514 to S518, the communication apparatus 151 determines whether the occurred event is a time-out of the timer T1. If the occurred event is a time-out of the timer T1, the communication apparatus 151 advances to step S519; otherwise, the communication apparatus 151 advances to step S522.

In step S519, if the WEC associated information is being output, the communication apparatus 151 stops the output. Processing contents are the same as in step S510 or S515.

In step S520, the communication apparatus 151 stops each of the timers T1 to T3, and clears it.

In step S521, the communication apparatus 151 performs DPP waiting mode time-out processing. More specifically, the communication apparatus 151 stops the setup access point (not shown) using the communication unit 156. The communication apparatus 151 deletes information such as the WEC associated information and the key pair. Then, the display unit 161 transitions from the wireless LAN simple setting processing-in-progress screen 410 to the wireless LAN simple setting time-out screen 450. If the period TP1 elapses without executing the predetermined processing (reception of the connection information or acceptance of a cancel instruction) in the waiting state in steps S518 to S521, the communication apparatus 151 ends the waiting state.

On the other hand, if the process advances from step S518 to S522, the communication apparatus 151 determines whether the occurred event is a time-out of the timer T3. If the occurred event is a time-out of the timer T3, the communication apparatus 151 advances to step S523; otherwise, the communication apparatus 151 advances to step S525.

In step S523, if the WEC associated information is being output, the communication apparatus 151 stops the output. Processing contents are the same as in step S510, S515, or S519. However, in step S510, S515, or S519, the output of the WEC associated information is stopped as preparation for ending the DPP waiting mode. However, in step S523, the meaning of the stop of the output is different. That is, step S523 is processing for stopping the output of the WEC associated information before the update of the WEC associated information. Furthermore, if the display of the QR Code® as the output of the WEC associated information ends, the communication apparatus 151 displays the wireless LAN simple setting processing-in-progress screen 410 on the display unit 161.

In step S524, the communication apparatus 151 stops the timer T3, and clears it. Then, the communication apparatus 151 returns to the event waiting state in step S508. That is, the communication apparatus 151 waits for an event in a state in which no QR Code® is displayed as the WEC associated information on the display unit 161 (a state in which the wireless LAN simple setting processing-in-progress screen 410 is displayed).

On the other hand, if the process advances from step S522 to step S525, it is determined whether the occurred event is a time-out of the timer T2. If the occurred event is a time-out of the timer T2, the communication apparatus 151 advances to step S526; otherwise, the communication apparatus 151 returns to step S508 to return to the event waiting state.

In step S526, if the WEC associated information is being output, the communication apparatus 151 stops the output. Processing contents are the same as in step S510, S515, S519, or S523.

In step S527, the communication apparatus 151 stops the timer T2, and clears it. Note that if the timer T3 is not stopped, the communication apparatus 151 also stops the timer T3, and clears it.

In step S528, the communication apparatus 151 performs processing to update the WEC associated information. That is, in a connection information waiting state, the communication apparatus 151 updates the WEC associated information including the public key information and output by the display unit 161. More specifically, the communication apparatus 151 regenerates WEC associated information to be output by Bootstrapping. In this example, there exists a public key as an element forming the WEC associated information but this is based on a key pair of the public key and a private key to be used in the subsequent DPP Authentication. That is, by performing the processing to update the WEC associated information, the public key included in the previous WEC associated information is disabled. In this example, disabling indicates that if the disabled public key is used, authentication of the DPP Authentication fails. A key pair may be regenerated in the processing to update the WEC associated information or may be regenerated in advance. As a practical example, a next key pair may be generated in the background of the display of the wireless LAN simple setting main screen 420 on the display unit 161 by the communication apparatus 151 and the event waiting state in step S508. The key pair regenerated in advance is held in the RAM 153, and read out at the start of the processing in step S528. In steps S525 to S528, in the waiting state of the communication apparatus 151, the communication apparatus 151 updates the WEC associated information in response to a lapse of the period TP2 shorter than the period TP1.

The output of the WEC associated information is stopped in step S523 before the processing to update the WEC associated information is performed in step S528. Therefore, during the predetermined period including the timing of updating the WEC associated information, the output stop state of the WEC associated information is set. At this time, the screen 410 representing that the QR Code® is being updated is displayed on the display unit 161.

Upon completion of the processing to update the WEC associated information in step S528, the communication apparatus 151 returns to step S505 to restart the processing. That is, the timer T2 is reset in step S505, the timer T3 is reset in step S506, and then output of the WEC associated information different from the previous information is started in step S507. If an event such as the success of reception of the connection information or acceptance of a cancel instruction does not occur, such processing is repeated until a time-out of the timer T1 occurs.

According to the above-described flowchart, time-out control is performed using the timer T1 set with the time limit of the DPP waiting mode and the timer T2 set with the shorter time limit of the WEC associated information. It is possible to update the key pair to be used in the DPP Authentication within a relatively short time, thereby improving security in the DPP waiting state. By setting a relatively long time-out time for the DPP waiting state at the same time, it is possible to prevent a situation in which an unintended time-out occurs to force the user to enter the DPP waiting state again, thereby improving the user operability.

In this embodiment, if the start trigger is not the operation of the operation unit 159, the period TP2 is set in the timer T2 in step S504 of FIG. 5A. That is, if the start trigger is not the operation of the operation unit 159, the set period of the timer T1 is shortened. Thus, the duration of the DPP waiting mode in a case where the start trigger is not the operation of the operation unit 159 is shortened, and it is thus possible to ensure security.

Note that in this embodiment, if the start trigger is not the operation of the operation unit 159, "set period of timer T1=set period of timer T2" is obtained and thus the WEC associated information is not updated while the DPP standby mode is executed. However, a form in which even if the start trigger is not the operation of the operation unit 159, the WEC associated information is updated can be adopted. For example, a period which is not the period TP2 (and which is shorter than the period TP1) may be set in the timer T2. Even if such setting is made, the time limit of the DPP waiting mode in a case where the start trigger is not the operation of the operation unit 159 is shorter than that in a case where the start trigger is the operation of the operation unit 159. Therefore, it is possible to ensure security in a case where the start trigger is not the operation of the operation unit 159.

Note that in this embodiment, the timers T1 and T2 are different timers. However, another arrangement that can achieve the same function may be adopted. For example, the entity of the timer T1 may not exist, processing may be performed to count the number of times of occurrence of a time-out of the timer T2, and a time-out of the timer T1 may be considered to occur when the counted number reaches a predetermined number. That is, in the DPP waiting mode, the communication apparatus 151 may end the DPP waiting mode in accordance with the number of times of update of the WEC associated information.

Furthermore, this embodiment assumes that the timers T2 and T3 are different timers but another arrangement that can achieve the same function may be adopted. For example, the entity of the timer T3 may not exist, processing may be performed to periodically monitor the remaining time until a time-out of the timer T2 occurs, and a time-out of the timer T3 may be considered to occur when the remaining time of the timer T2 becomes shorter than a predetermined time. That is, the communication apparatus 151 may stop the output of the WEC associated information during a predetermined time until the processing to update the WEC associated information is started.

Note that as described above, in this embodiment, the time limit of the DPP waiting mode and the time limit until the WEC associated information is updated are elements associated with processing. Therefore, the WEC associated information may include information concerning the time limit of the DPP waiting mode and information concerning the time limit until the WEC associated information is updated. For example, there is a method of including, in the WEC associated information, a numerical value held as the time limit of the DPP waiting mode and a numerical value held as the time limit until the WEC associated information is updated. As another example, there is a method of calculating, based on time information held in the communication apparatus 151, a time at which each time limit is reached and including the calculated time in the WEC associated information. As described above, by including the information concerning the time limit of the DPP waiting mode and the information concerning the time limit of the WEC associated information in the WEC associated information, the WEC associated information acquired by the information processing apparatus 101 can be used to determine, on the side of the information processing apparatus 101, whether the information is enabled.

Figure 6:
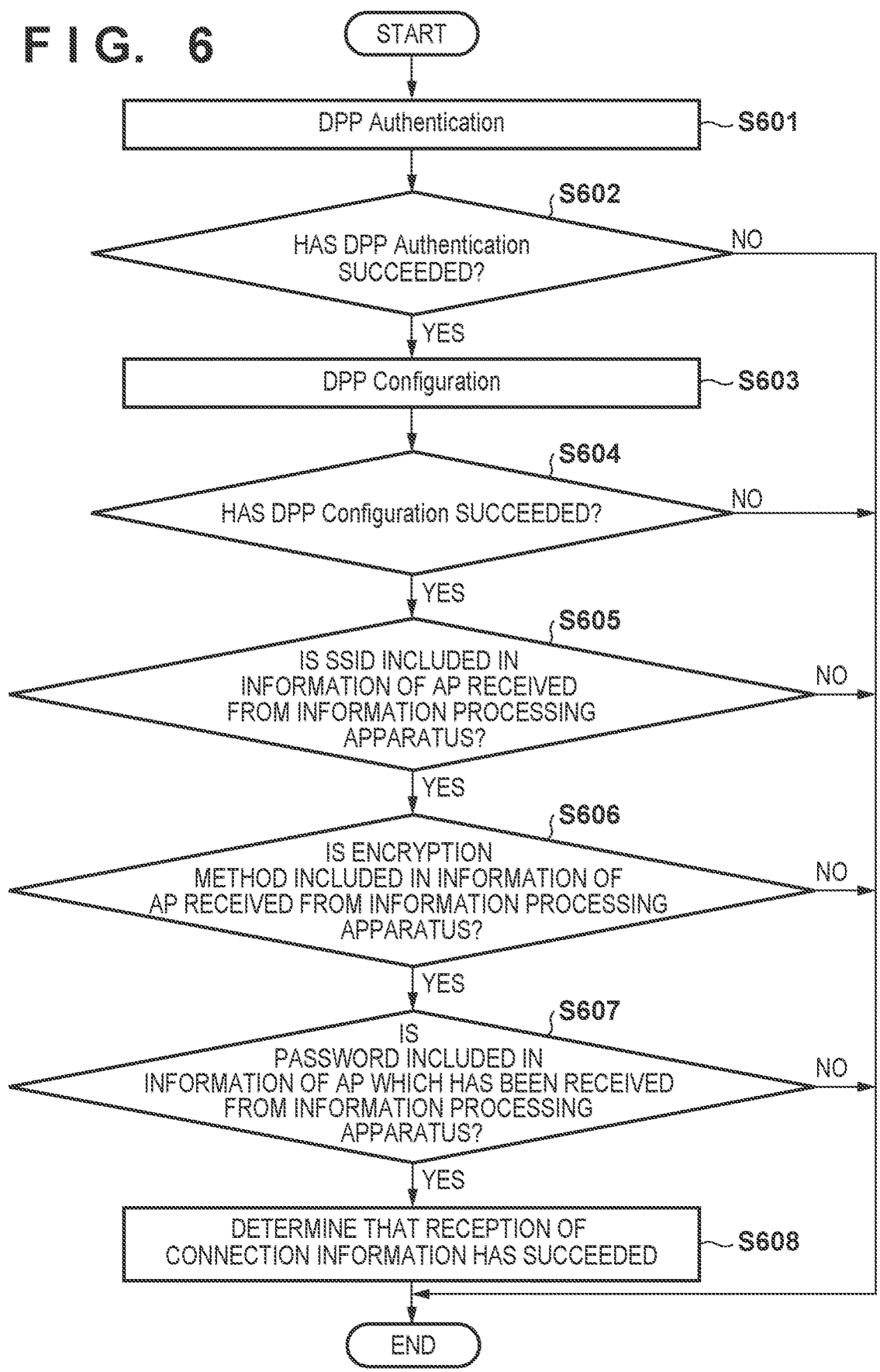
FIG. 6 is a flowchart illustrating an example of control of the communication apparatus.

FIG. 6 is a flowchart illustrating an example of control of the communication apparatus 151. This flowchart is a flowchart for determining whether an event of the success of reception of the connection information occurs. This flowchart corresponds to S203 and S204 in the sequence chart of FIG. 2 and steps S508 and S509 in the flowchart of FIGS. 5A and 5B.

In step S601, the communication apparatus 151 executes the DPP Authentication processing. More specifically, as described above, in the DPP Authentication processing, authentication information, information used to encrypt information, and the like are communicated between the information processing apparatus 101 and the communication apparatus 151, thereby authenticating communication between the apparatuses, thereby authenticating communication between the apparatus. Note that in the DPP Authentication, communication is executed using DPP.

In step S602, the communication apparatus 151 determines whether the DPP Authentication processing with the information processing apparatus 101 succeeds. More specifically, as described above, various kinds of information transmitted from the information processing apparatus 101 in the communication of the DPP Authentication are encrypted based on the WEC associated information acquired by the information processing apparatus 101 in the processing shown in FIG. 2. If the communication apparatus 151 successfully decrypts the information received from the information processing apparatus 101 by a decryption key held in advance, the communication apparatus 151 authenticates communication with the information processing apparatus 101. Note that if the information processing apparatus 101 cannot acquire correct WEC associated information and cannot encrypt the information correctly, decryption by the communication apparatus 151 fails and thus authentication fails. Therefore, if the communication apparatus 151 successfully authenticates communication with the information processing apparatus 101, the communication apparatus 151 determines that the DPP Authentication processing succeeds; otherwise, the communication apparatus 151 determines that the DPP Authentication processing fails. If NO is determined in step S602, the communication apparatus 151 ends this flowchart. On the other hand, if YES is determined in step S602, the communication apparatus 151 advances to step S603.

In step S603, the communication apparatus 151 executes the DPP Configuration processing. In the DPP Configuration processing, the communication apparatus 151 receives, by WEC, the connection information for connection to the access point set as the setting target of WEC from the information processing apparatus 101. Note that the connection information includes information representing the SSID, password, and encryption method of the access point set as the setting target of WEC.

In step S604, the communication apparatus 151 determines whether the DPP Configuration processing with the information processing apparatus 101 succeeds. More specifically, if the communication apparatus 151 receives, by WEC, the connection information for connection to the access point set as the setting target of WEC from the information processing apparatus 101, the communication apparatus 151 determines that the DPP Configuration processing succeeds; otherwise, the communication apparatus 151 determines that the DPP Configuration processing fails. If NO is determined in step S604, the communication apparatus 151 ends this flowchart. On the other hand, if YES in determined in step S604, the communication apparatus 151 advances to step S605. Note that if the DPP Configuration processing succeeds, the communication apparatus 151 acquires the SSID, encryption method, and password of the access point.

In step S605, the communication apparatus 151 determines whether the information of the access point set as the setting target of WEC, which has been received from the information processing apparatus 101, includes the SSID. If NO is determined in step S605, the communication apparatus 151 ends this flowchart. On the other hand, if YES is determined in step S605, the communication apparatus 151 advances to step S606.

In step S606, the communication apparatus 151 determines whether the information of the access point set as the setting target of WEC, which has been received from the information processing apparatus 101, includes the encryption method. If NO is determined in step S606, the communication apparatus 151 ends this flowchart. On the other hand, if YES is determined in step S606, the communication apparatus 151 advances to step S607.

In step S607, the communication apparatus 151 determines whether the information of the access point set as the setting target of WEC, which has been received from the information processing apparatus 101, includes the password. Note that if the communication apparatus 151 is connected to the access point using DPP communication, it may be determined whether the information includes public key information instead of the password. If NO is determined in step S607, the communication apparatus 151 ends this flowchart.

In step S608, the communication apparatus 151 determines that reception of the connection information succeeds. If such determination is performed, the communication apparatus 151 advances from step S509 to processing in step S510 and the subsequent steps in the flowchart of FIGS. 5A and 5B, and ends the DPP waiting mode to attempt wireless LAN setting processing.

Modification

A modification of the above embodiment will be described. In the above embodiment, as a method of ensuring security in establishment of connection between the communication apparatus 151 and the access point, (1) the WEC associated information is updated while the DPP waiting mode is executed and (2) the time limit of the DPP waiting mode is changed. An arrangement of performing only one of these operations can also be adopted.

First, an arrangement corresponding to (1) above, that is, an arrangement in which the duration of the DPP waiting mode is not changed between a case where the start trigger is the operation of the operation unit 159 and a case where the start trigger is not the operation of the operation unit 159 will be described. In this modification, even if the duration of the DPP waiting mode in a case where the start trigger is not the operation of the operation unit 159 is not relatively shortened, it is possible to improve both security and user convenience by updating the WEC associated information while the DPP waiting mode is executed. FIG. 7 shows an overview of processing according to this modification.

Processing in step S701 is the same as in step S501. In step S702, the communication apparatus 151 starts measurement of the timers T1 and T2. Note that the timer T1 is set with the predetermined period TP1 regardless of the type of the start trigger. Processing in step S703 is the same as in step S507.

In step S704, the communication apparatus 151 determines whether the connection information is received. If it is determined that the connection information is received, the communication apparatus 151 advances to step S705; otherwise, the communication apparatus 151 advances to step S706. The processing in step S704 corresponds to that in step S509.

In step S705, the communication apparatus 151 executes wireless LAN setting processing, and ends this flowchart. Step S705 corresponds to step S513. Note that the communication apparatus 151 executes processing corresponding to steps S510 to S512 of FIG. 5B, as needed, before execution of step S705 although this flowchart does not illustrate the processing because this flowchart represents an overview of the processing.

In step S706, the communication apparatus 151 confirms whether the time limit of the DPP waiting mode has passed or not. If it is determined that the time limit has passed, the communication apparatus 151 advances to step S707; otherwise, the communication apparatus 151 advances to step S708. The processing in step S706 corresponds to that in step S518.

In step S707, the communication apparatus 151 performs DPP waiting mode time-out processing. Step S707 corresponds to step S521. Note that the communication apparatus 151 executes processing corresponding to steps S519 to S521 of FIG. 5B, as needed, before execution of step S707 although this flowchart does not illustrate the processing because this flowchart represents an overview of the processing.

In step S708, the communication apparatus 151 confirms whether the time limit of the WEC associated information has passed or not. If it is determined that the time limit has passed, the communication apparatus 151 advances to step S709; otherwise, the communication apparatus 151 returns to step S704. Step S708 corresponds to step S525.

In step S709, the communication apparatus 151 executes processing to update the WEC associated information. Step S709 corresponds to step S528. Note that the communication apparatus 151 executes processing corresponding to steps S526 and S527 of FIG. 5A, as needed, before execution of step S709 although this flowchart does not illustrate the processing because this flowchart represents an overview of the processing.

Furthermore, the communication apparatus 151 may stop the output of the WEC associated information during a predetermined time until the time limit of the WEC associated information passes. That is, the communication apparatus 151 may execute processing corresponding to steps S522 to S524. If the communication apparatus 151 accepts a cancel instruction by the operation of the operation unit 159 or the like before the time limit of the DPP waiting mode passes, the communication apparatus 151 may execute the DPP waiting mode cancel processing. That is, the communication apparatus 151 may execute processing corresponding to steps S514 to S517.

With the above-described processing as well, it is possible to improve both security and user convenience by updating the WEC associated information during a predetermined period while the DPP waiting mode is executed.

Next, an arrangement corresponding to (2) above, that is, an arrangement in which the time limit of the DPP waiting mode in a case where the start trigger is not the operation of the operation unit 159 is made shorter than that in a case where the start trigger is the operation of the operation unit 159 and the WEC associated information is not updated while the DPP waiting mode is executed will be described. In this modification, if the possibility of an attack from the outside is relatively low (the start trigger is the operation of the operation unit 159), the duration of the DPP waiting mode is relatively prolonged, thereby making it possible to improve user convenience. Furthermore, if the possibility of an attack from the outside is relatively high (the start trigger is not the operation of the operation unit 159), the duration of the DPP waiting mode is relatively shortened, thereby making it possible to ensure security. FIG. 8 shows an overview of processing in this case.

Processes in steps S801 and S802 are the same as those in steps S501 and S502, respectively. If YES is determined in step S802, the communication apparatus 151 sets the period TP1 in the timer T1 and starts measurement in step S803. On the other hand, if NO is determined in step S802, the communication apparatus 151 sets a period shorter than the period TP1 in the timer T1 and starts measurement in step S804.

Step S805 corresponds to step S507. Steps S806 to S809 correspond to steps S704 to S707 of FIG. 7, respectively. Note that the communication apparatus 151 executes the processing of stopping the output of the WEC associated information, the processing of stopping the timer T1, the DPP waiting mode completion processing (in a case of step S807), or the like, as needed, before execution of steps S807 and S809 although this flowchart does not illustrate the processing because this flowchart represents an overview of the processing. If the communication apparatus 151 accepts a cancel instruction by the operation of the operation unit 159 or the like before the time limit of the DPP waiting mode passes, the communication apparatus 151 may execute the DPP waiting mode cancel processing. That is, the communication apparatus 151 may execute processing corresponding to steps S514 to S517.

With the above-described processing as well, it is possible to improve both security and user convenience by relatively shortening the time limit of the DPP waiting mode in a case where the start trigger of the DPP waiting mode is not the operation of the operation unit 159 of the communication apparatus 151.

As another modification, the update frequency of the WEC associated information (the public key information included therein) may be changed between a case where the start trigger is the operation of the operation unit 159 and a case where the start trigger is not the operation of the operation unit 159. More specifically, the set time of the timer T2 may be changed. For example, the same period may be set in the timer T1 between a case where the start trigger is the operation of the operation unit 159 and a case where the start trigger is not the operation of the operation unit 159, and the period of the timer T2 may be set shorter in a case where the start trigger is not the operation of the operation unit 159. Thus, the update frequency of the WEC associated information (the public key information included therein) is higher in a case where the start trigger is not the operation of the operation unit 159 than in a case where the start trigger is the operation of the operation unit 159. Therefore, it is possible to facilitate avoiding an attack from the outside.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088877, filed May 31, 2022, which is hereby incorporated by reference herein in its entirety.

What is claimed is:

1. A communication apparatus which is able to receive, by a predetermined communication protocol, first information for connecting with a first external apparatus and is able to output second information for performing authentication, by the predetermined communication protocol, the communication apparatus comprising:
a memory containing instructions and a processor to execute the instructions to function as:
a waiting unit configured to cause the communication apparatus to start, based on a predetermined trigger, an operation in a waiting state to wait for a request of the authentication by the predetermined communication protocol, the request of the authentication being transmitted from a second external apparatus which has obtained the second information output from the communication apparatus;
an output unit configured to start, based on the predetermined trigger, output of the second information;
an authentication unit configured to, in a case where the request of the authentication is received from the second external apparatus in a state that the communication apparatus operates in the waiting state, perform the authentication by the predetermined communication protocol based on a communication by the predetermined communication protocol between the communication apparatus and the second external apparatus;
a reception unit configured to receive the first information by the predetermined communication protocol from the second external apparatus which has been authenticated by the predetermined communication protocol;
an establishment unit configured to establish a connection between the first external apparatus and the communication apparatus based on the first information being received; and
an update unit configured to update the second information output by the output unit in a state that the communication apparatus operates in the waiting state,
wherein the waiting unit stops the waiting state of the communication apparatus based on a first period elapsing, from a start of an operation in the waiting state of the communication apparatus, without a predetermined process being performed, and
the update unit updates the second information based on a second period shorter than the first period elapsing from a start of the operation in the waiting state of the communication apparatus.

2. The apparatus according to claim 1, wherein the instructions are further executed to function as:
an input unit configured to accept operation input by a user;
a first acceptance unit configured to accept, by the input unit, a start instruction to start the waiting state; and
a second acceptance unit configured to accept the start instruction by wireless communication,
wherein the predetermined trigger is that the start instruction is accepted by the first acceptance unit or the second acceptance unit.

3. The apparatus according to claim 2, wherein the first period in a case where the first acceptance unit accepts the start instruction is longer than the first period in a case where the second acceptance unit accepts the start instruction.

4. The apparatus according to claim 2, wherein
in a case where the first acceptance unit accepts the start instruction, the update unit updates the second information based on the second period elapsing from the start of the operation in the waiting state of the communication apparatus, and
in a case where the second acceptance unit accepts the start instruction, the update unit updates the second information based on a third period shorter than the second period elapsing from the start of the operation in the waiting state of the communication apparatus.

5. The apparatus according to claim 2, wherein an update frequency of the second information by the update unit is higher in a case where the first acceptance unit accepts the start instruction than in a case where the second acceptance unit accepts the start instruction.

6. The apparatus according to claim 2, wherein
in a case where the first acceptance unit accepts the start instruction, the update unit updates the second information based on the second period elapsing from the start of the operation in the waiting state of the communication apparatus, and
even in a case where the start instruction is accepted, the update unit does not update the second information in the waiting state in a case where the second acceptance unit accepts the start instruction.

7. The apparatus according to claim 1, wherein
the output unit can switch, in the waiting state, between an output state of outputting the second information and an output stop state of stopping the output of the second information, and
the output unit sets the output stop state during a fourth period including a timing of updating the second information by the update unit.

8. The apparatus according to claim 7, wherein
in the output state, the output unit displays, on a display unit of the communication apparatus, a code that is readable by the second external apparatus and corresponds to the second information, and
in the output stop state, the output unit displays, on the display unit, a screen indicating that the code is being updated.

9. The apparatus according to claim 1, wherein the output unit displays, on a display unit of the communication apparatus, a code that is readable by the second external apparatus and corresponds to the second information.

10. The apparatus according to claim 1, wherein the waiting unit ends the waiting state in accordance with the number of times of update of the second information by the update unit.

11. The apparatus according to claim 1, wherein the predetermined communication protocol is Device Provisioning Protocol.

12. The apparatus according to claim 11, wherein the update unit updates public key information included in the second information.

13. The apparatus according to claim 1, wherein the predetermined process is a process of receiving the first information.

14. The apparatus according to claim 1, wherein the predetermined process is a process of accepting a user operation for stopping an operation in the waiting state of the communication apparatus.

15. The apparatus according to claim 1, wherein the instructions are further executed to function as a reception unit configured to receive a print job after a connection between the first external apparatus and the communication apparatus is established; and
further comprising a print unit configured to perform printing based on the print job.

16. A control method for a communication apparatus which is able to receive, by a predetermined communication protocol, first information for connecting with a first external apparatus and is able to output second information for performing authentication, by the predetermined communication protocol, comprising:
causin the communication apparatus to start, based on a predetermined trigger, an operation in a waiting state to wait for a request of the authentication by the predetermined communication protocol, the request of the authentication being transmitted from a second external apparatus which has obtained the second information output from the communication apparatus;
causing the communication apparatus to start, based on the predetermined trigger, output of the second information;
in a case where the request of the authentication is received from the second external apparatus in a state that the communication apparatus operates in the waiting state, performing the authentication by the predetermined communication protocol based on a communication by the predetermined communication protocol between the communication apparatus and the second external apparatus;
receiving the first information by the predetermined communication protocol from the second external apparatus which has been authenticated by the predetermined communication protocol;
establishing a connection between the first external apparatus and the communication apparatus based on the first information being received; and
causing the communication apparatus to update the output second information in a state that the communication apparatus operates in the waiting state,
wherein the waiting state of the communication apparatus is stopped based on a first period elapsing, from a start of an operation in the waiting state of the communication apparatus, without a predetermined process being performed and,
updating the second information based on a second period shorter than the first period elapsing from a start of the operation in the waiting state of the communication apparatus.

17. A non-transitory computer-readable storage medium storing a program configured to cause a communication apparatus which is able to receive, by a predetermined communication protocol, first information for connecting with a first external apparatus and is able to output second information for performing authentication, by the predetermined communication protocol, to:
cause the communication apparatus to start, based on a predetermined trigger, an operation in a waiting state to wait for a request of the authentication by the predetermined communication protocol, the request of the authentication being transmitted from a second external apparatus which has obtained the second information output from the communication apparatus;
cause the communication apparatus to start, based on the predetermined trigger, output of the second information;
in a case where the request of the authentication is received from the second external apparatus in a state that the communication apparatus operates in the waiting state, perform the authentication by the predetermined communication protocol based on a communication by the predetermined communication protocol between the communication apparatus and the second external apparatus;
receive the first information by the predetermined communication protocol from the second external apparatus which has been authenticated by the predetermined communication protocol;
establish a connection between the first external apparatus and the communication apparatus based on the first information being received; and
update the output second information in a state that the communication apparatus operates in the waiting state,
wherein the waiting state of the communication apparatus is stopped based on a first period elapsing, from a start of an operation in the waiting state of the communication apparatus, without a predetermined process being performed, and
update the second information based on a second period shorter than the first period elapsing from a start of the operation in the waiting state of the communication apparatus.

* * * * *